US012703006B2

(12) United States Patent
Hirata et al.

(10) Patent No.: US 12,703,006 B2
(45) Date of Patent: Aug. 11, 2026

(54) METHOD FOR MANUFACTURING ULTRASONIC TRANSDUCER, ULTRASONIC TRANSDUCER, AND DISTANCE MEASURING EQUIPMENT

(71) Applicant: Mitsubishi Electric Corporation, Tokyo (JP)

(72) Inventors: Yoshiaki Hirata, Tokyo (JP); Yoshitaka Kajiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 234 days.

(21) Appl. No.: 18/723,878

(22) PCT Filed: Jan. 4, 2022

(86) PCT No.: PCT/JP2022/000027
§ 371 (c)(1),
(2) Date: Jun. 25, 2024

(87) PCT Pub. No.: WO2023/131986
PCT Pub. Date: Jul. 13, 2023

(65) Prior Publication Data

US 2025/0073751 A1 Mar. 6, 2025

(51) Int. Cl.

*B06B 1/06* (2006.01)
*G01S 7/521* (2006.01)
*G01S 15/08* (2006.01)

(52) U.S. Cl.
CPC ............ *B06B 1/0666* (2013.01); *G01S 7/521* (2013.01); *G01S 15/08* (2013.01); *B06B 2201/70* (2013.01)

(58) Field of Classification Search
CPC ....... G01S 7/521; G01S 15/08; B06B 1/0666; B06B 2201/70
(Continued)

(56) References Cited

U.S. PATENT DOCUMENTS

2008/0174665 A1 7/2008 Enstad et al.

FOREIGN PATENT DOCUMENTS

CN 110681559 A * 1/2020 ........... B06B 1/0603
JP 2546488 B2 10/1996
(Continued)

OTHER PUBLICATIONS

CN-110681559-A (machine translation) (Year: 2020).*
(Continued)

*Primary Examiner* — Yuqing Xiao
*Assistant Examiner* — Christopher Richard Walker
(74) *Attorney, Agent, or Firm* — XSENSUS LLP

(57) ABSTRACT

A method for manufacturing an ultrasonic transducer comprises the following steps: A first SOI substrate including a first silicon film, a second silicon film, and an intermediate silicon oxide film sandwiched between the first silicon film and the second silicon film is prepared. A piezoelectric element is formed on the first silicon film of the first SOI substrate. The second silicon film is etched to form a diaphragm. A silicon substrate is connected to the second silicon film. An opening and a gap are formed in an acoustically resonant structure including the first SOI substrate and the silicon substrate and the diaphragm and the acoustically resonant structure are also matched in resonant frequency so as to amplify vibration of a sonic wave of the diaphragm.

10 Claims, 13 Drawing Sheets

(58) Field of Classification Search
USPC .......................................................... 367/99
See application file for complete search history.

(56) References Cited

FOREIGN PATENT DOCUMENTS

| | | | | |
|---|---|---|---|---|
| JP | 2005051689 | A | * | 2/2005 |
| JP | 2010-515335 | A | | 5/2010 |

OTHER PUBLICATIONS

JP-2005051689-A (machine translation) (Year: 2005).*
Lo et al. ("Development of a no-back-plate SOI MEMS condenser microphone." 2015 Transducers—2015 18th International Conference on Solid-State Sensors, Actuators and Microsystems (Transducers). IEEE, 2015., "Lo") (Year: 2015).*
International Search Report and Written Opinion mailed on Apr. 12, 2022, received for PCT Application No. PCT/JP2022/000027, filed on Jan. 4, 2022, 8 pages including English Translation.

* cited by examiner (a)

METHOD FOR MANUFACTURING ULTRASONIC TRANSDUCER, ULTRASONIC TRANSDUCER, AND DISTANCE MEASURING EQUIPMENT

CROSS-REFERENCE TO RELATED APPLICATION

This application is a national stage application, pursuant to 35 U.S.C. § 371, of International Patent Application No. PCT/JP2022/000027, filed Jan. 4, 2022, the entire contents of which are incorporated herein by reference.

TECHNICAL FIELD

The present disclosure relates to a method for manufacturing an ultrasonic transducer, the ultrasonic transducer, and distance measuring equipment BACKGROUND ART Ultrasonic transducers have been used as distance sensors for use in monitoring surroundings of automobiles and vehicles or in contactlessly operating devices. For generally widely used ultrasonic transduces, it is a mainstream to use bulky lead zirconate titanate (PZT:Pb(Zr, Ti)$O_3$) as an actuator. For ultrasonic transducers using bulky lead zirconate titanate (PZT) as an actuator, however, there is a limit in miniaturization due to machining accuracy. Accordingly, microelectromechanical system (MEMS) ultrasonic transducers have been developed as miniaturizable ultrasonic transducers.

A most common structure of the MEMS ultrasonic transducer employs a thin-film diaphragm (or a membrane). Silicon is used as a material for the structure of the MEMS ultrasonic transducer including the diaphragm. The MEMS ultrasonic transducer is processed by semiconductor technology such as deep reactive ion etching (DRIE) Applying semiconductor technology with high dimensional accuracy to processing allows a diaphragm to be miniaturized as compared with a conventional product manufactured by machining.

A known method for improving sound pressure of an ultrasonic transducer is to apply an acoustically resonant structure. For example, Japanese National Patent Publication No. 2010-515335 (PTL 1) discloses an audio source tracking arrangement comprising an MEMS microphone, a cavity in which the MEMS microphone is localized, an aperture on a surface of a microphone housing, and a channel extending from the cavity to the aperture. The audio source tracking arrangement has the channel and the cavity dimensioned to form an acoustical amplifier with a frequency response.

CITATION LIST

Patent Literature

PTL 1: Japanese National Patent Publication No. 2010-515335

SUMMARY OF INVENTION

Technical Problem in the audio source tracking arrangement described in the above publication, the microphone housing provided with the cavity, the aperture and the channel forms an acoustically resonant structure. Using the acoustically resonant structure as described in the above publication to significantly effectively amplify the sound pressure of the ultrasonic transducer requires the diaphragm's resonant frequency and the acoustically resonant structure's resonant frequency to be as close as possible. Accordingly, as the diaphragm is miniaturized, the acoustically resonant structure is also required to have high dimensional accuracy. In particular, for a miniaturized MEMS ultrasonic transducer, it is necessary to manufacture an acoustically resonant structure with high dimensional accuracy within several tens of micrometers. Therefore, a precise assembly process is required when the MEMS ultrasonic transducer is accommodated in the acoustically resonant structure.

The present disclosure has been made in view of the above issue, and contemplates a method for manufacturing an ultrasonic transducer that is capable of manufacturing a diaphragm and an acoustically resonant structure with high dimensional accuracy and causing the diaphragm and the acoustically resonant structure to match in resonant frequency to obtain significantly effective amplification, the ultrasonic transducer, and distance measuring equipment.

Solution to Problem

The presently disclosed method for manufacturing an ultrasonic transducer comprises the following steps. A first SOI substrate including a first silicon film, a second silicon film, and an intermediate silicon oxide film sandwiched between the first silicon film and the second silicon film is prepared. A piezoelectric element is formed on the first silicon film of the first SOI substrate. The second silicon film and the intermediate silicon oxide film of the first SOI substrate are etched to form a diaphragm of the first silicon film. A silicon substrate is connected to the second silicon film. An opening and a gap are formed in an acoustically resonant structure including the first SOI substrate and the silicon substrate and the diaphragm and the acoustically resonant structure are also matched in resonant frequency so as to amplify a sonic wave of vibration of the diaphragm.

Advantageous Effects of Invention

The presently disclosed method for manufacturing an ultrasonic transducer can manufacture a diaphragm and an acoustically resonant structure with high dimensional accuracy and cause the diaphragm and the acoustically resonant structure to match in resonant frequency to obtain significantly effective amplification.

BRIEF DESCRIPTION OF DRAWINGS

FIG. 8 is a perspective view schematically showing a configuration of an exemplary variation of the ultrasonic transducer according to the third embodiment.

FIG. 12 is a schematic cross section for illustrating a method for adjusting an exemplary variation of the ultrasonic transducer according to the fifth embodiment.

DESCRIPTION OF EMBODIMENTS

Embodiments will now be described with reference to the accompanying drawings. In the following, identical or equivalent components are identically denoted and will not be described redundantly.

First Embodiment

Figure 1:
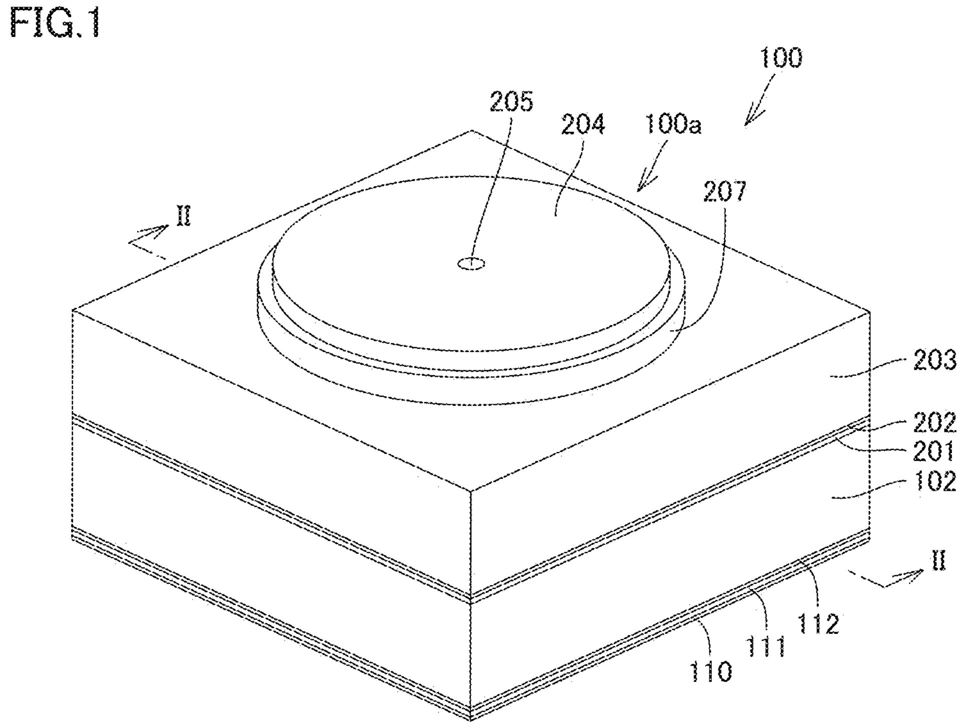
FIG. 1 is a perspective view schematically showing a configuration of an ultrasonic transducer according to a first embodiment.
Figure 2:
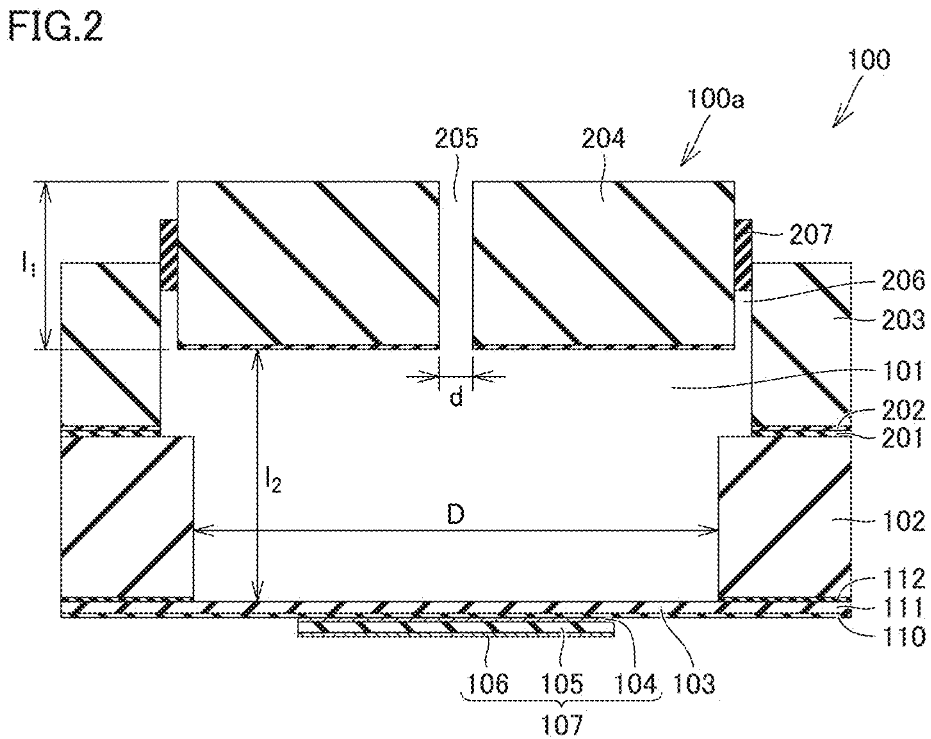
FIG. 2 is a cross section taken along a line II-II indicated in FIG. 1.

A structure of an ultrasonic transducer 100 according to a first embodiment will now be described with reference to FIGS. 1 and 2. FIG. 1 is a perspective view of ultrasonic transducer 100 according to the first embodiment. FIG. 2 is a cross section taken along a line II-II indicated in FIG. 1.

Ultrasonic transducer 100 according to the first embodiment is a microelectromechanical system (MEMS) ultrasonic transducer. That is, ultrasonic transducer 100 is formed integrally by MEMS Ultrasonic transducer 100 mainly comprises: a first support 102; a diaphragm 103, a piezoelectric element 107 including a bottom electrode 104, a piezoelectric thin film 105, and a top electrode 106, a second support 203; and a movable plate 204. Piezoelectric element 107 is disposed on diaphragm 103. Movable plate 204 is provided with an opening 205. Opening 205 is located at a center of movable plate 204 in a plan view. Opening 205 is formed so as to reach a gap 101. Opening 205 is formed cylindrically. Opening 205 is in communication with gap 101. Gap 101 is surrounded by first support 102, diaphragm 103, second support 203, and movable plate 204. Gap 101 is generally in the form of a cylinder. Opening 205 and gap 101 have their respective volumes together forming a cavity volume.

Material for a structure composed of first support 102, diaphragm 103, second support 203 and movable plate 204 is desirably silicon (Si) as it helps application of semiconductor manufacturing technology and also has an excellent mechanical property as an elastic material. In the present embodiment, first support 102 and diaphragm 103 are formed of SOT (Silicon on Insulator). Second support 203 and movable plate 204 are formed of a silicon substrate. An acoustically resonant structure 100*a* includes first support 102 and diaphragm 103 configured by an SOT substrate, and second support 203 and movable plate 204 configured by a silicon substrate. Piezoelectric element 107 is attached to acoustically resonant structure 100*a*. Diaphragm 103 configured by the SOI substrate is connected to first support 102. Second support 203 configured by the silicon substrate is connected to first support 102 on a side opposite to diaphragm 103 with respect to first support 102. Movable plate 204 configured by the silicon substrate is connected to second support 203 so as to face diaphragm 103. Piezoelectric element 107 is connected to diaphragm 103 of acoustically resonant structure 100*a*. Opening 205 and gap 101 are formed to cause diaphragm 103 and acoustically resonant structure 100*a* to match in resonant frequency. Material for bottom electrode 104 and top electrode 106 is desirably a stack of layers of films generally used for a piezoelectric element, i.e., a titanium (Ti) film and a platinum (Pt) film. Note that any other stack of layers of films may be used insofar as it has sufficient conductivity as an electrode and ensures good adhesion to an underlying material or the like. Furthermore, an oxide electrode film such as a strontium oxide (SrO) film, which is assumed to effectively reduce polarization fatigue, may be interposed between top electrode 106 and piezoelectric thin film 105. For piezoelectric thin film 105, a material is used such as lead zirconate titanate (PZT:Pb(Zr, Ti)$O_3$), aluminum nitride (AlN), or potassium sodium niobate (KNN:(K, Na)$NbO_3$).

Hereinafter, an operation of ultrasonic transducer 100 according to the first embodiment will be described. When voltage is applied between bottom electrode 104 and top electrode 106, piezoelectric thin film 105 contracts. As piezoelectric thin film 105 contracts, diaphragm 103 bends. When voltage is applied at a frequency close to the resonant frequency of diaphragm 103, diaphragm 103 resonates. Thus, ultrasonic transducer 100 can generate ultrasonic waves.

When ultrasonic transducer 100 is used as an ultrasonic sensor, vibrations of diaphragm 103 vibrated by ultrasonic waves are obtained by piezoelectric element 107 as a voltage signal.

Gap 101 and opening 205 are dimensioned so that diaphragm 103 and acoustically resonant structure 100*a* have their respective resonant frequencies close to each other.

Acoustically resonant structure 100*a* has a resonant frequency $f_h$ represented using a diameter D of gap 101, a diameter d of opening 205, a length $l_1$ of opening 205, a length $l_2$ of the gap, correction a for the opening, sonic velocity c, an area $S_m$ of opening 205, and a volume $V_c$ of gap 101, as indicated below by an expression (1). Area $S_m$ of opening 205 is represented as indicated below by an expression (2). Volume $V_c$ of the gap is represented as indicated below by an expression (3).

[Formula 1]

$$f_h = \frac{c}{2\pi}\sqrt{\frac{S_m}{(l_1 + a(d/2))V_c}} \quad (1)$$

[Formula 2]

$$S_m = \pi(d/2)^2 \quad (2)$$

[Formula 3]

$$V_c = \pi(D/2)^2 l_2 \quad (3)$$

By thus dimensioning gap 101 and opening 205 so that diaphragm 103 and acoustically resonant structure 100*a* have their respective resonant frequencies close to each other, a sound pressure of a sound generated as diaphragm 103 vibrates can be amplified by acoustic resonance.

Further, when ultrasonic transducer 100 is used as an ultrasonic sensor, diaphragm 103 can be vibrated more by amplifying a sound pressure of a received ultrasonic wave by acoustic resonance. This increases strain of piezoelectric element 107 disposed on diaphragm 103, and a larger signal can be obtained.

Note that causing diaphragm 103 and the acoustically resonant structure to match in resonant frequency requires an adjustment mechanism Ultrasonic transducer 100 according to the first embodiment allows movable plate 204 to be moved to change length 1: of the gap to adjust an acoustic resonant frequency. Movable plate 204 is positionally adjusted while an ultrasonic output generated from opening 205 by vibrating diaphragm 103 is measured. A structure for maximum amplification can be obtained by fixing movable plate 204 with adhesive 207 at a position at which an optimum value of the ultrasonic output is generated.

Figure 3:
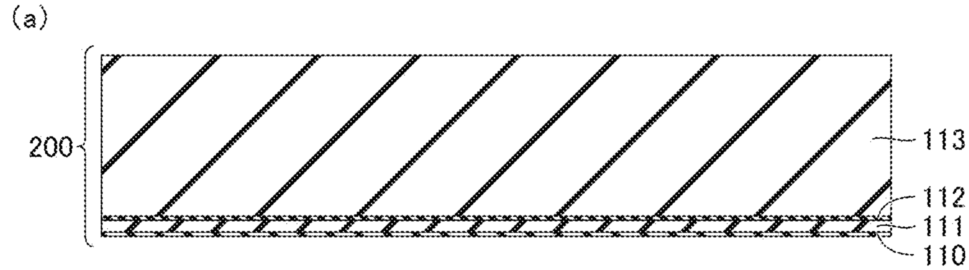
FIG. 3 is a schematic cross section showing a first step of a method for manufacturing the ultrasonic transducer according to the first embodiment.
Figure 3:
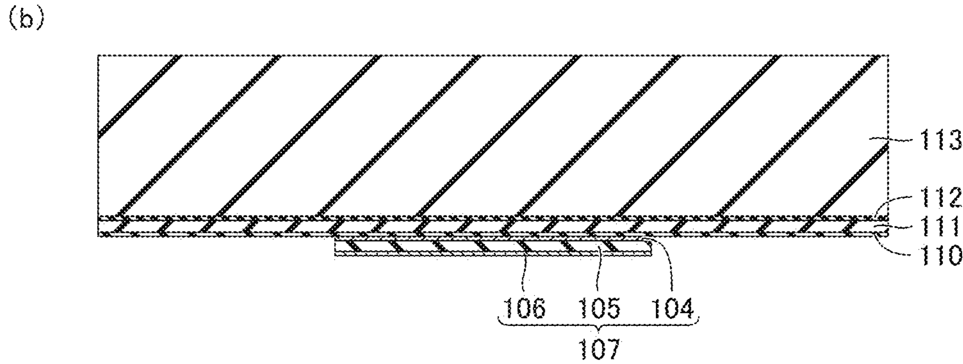
Figure 3:
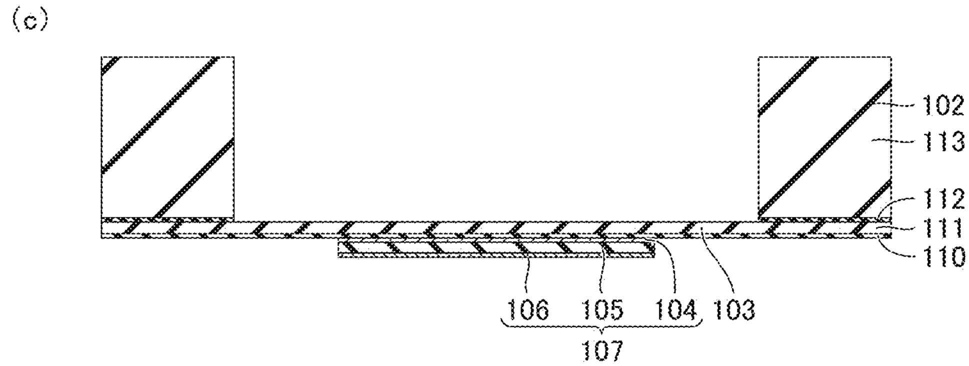
Figure 4:
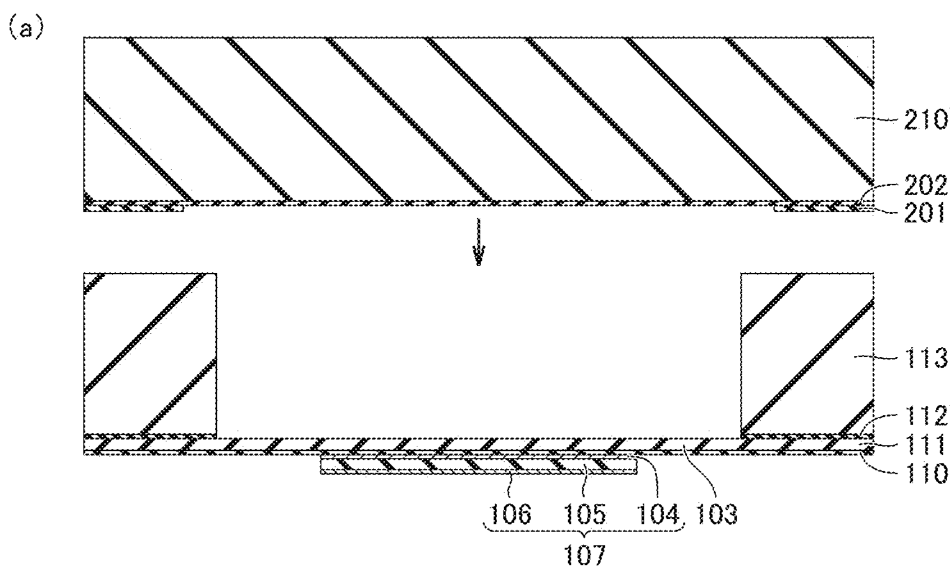
FIG. 4 is a schematic cross section showing a second step of the method for manufacturing the ultrasonic transducer according to the first embodiment.
Figure 4:
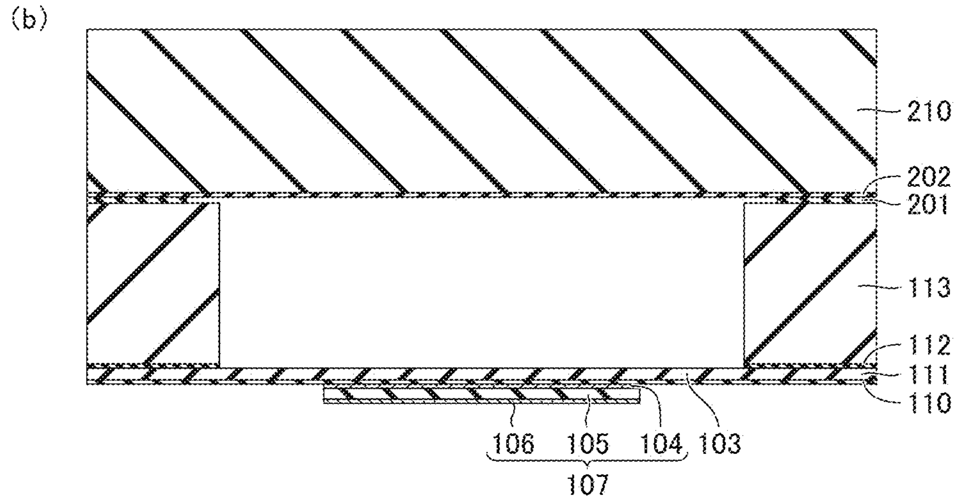
Figure 4:
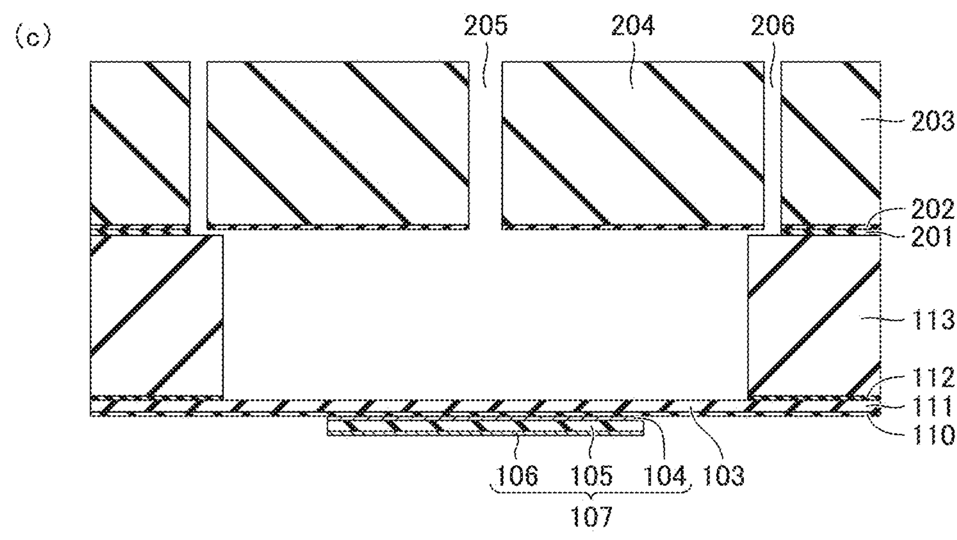
Figure 5:
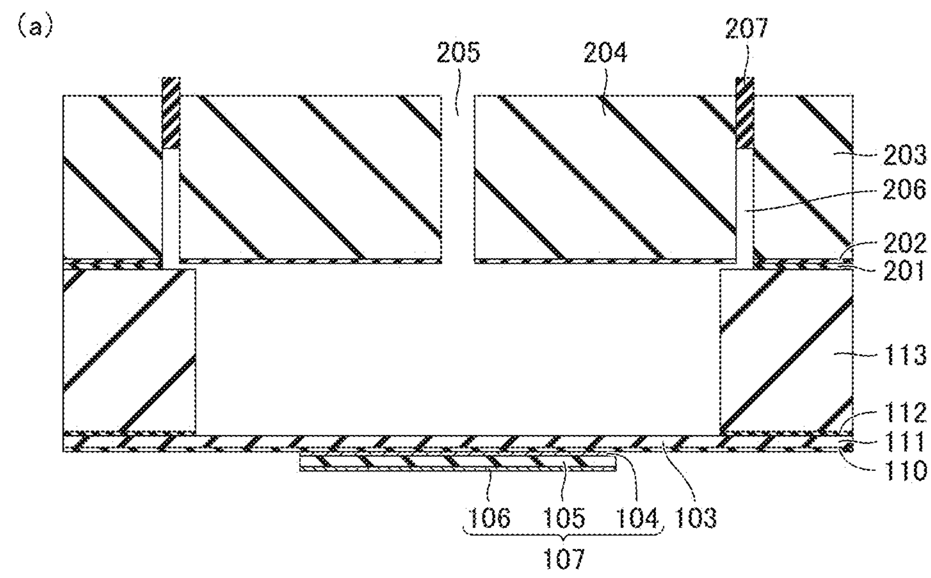
FIG. 5 is a schematic cross section showing a third step of the method for manufacturing the ultrasonic transducer according to the first embodiment.
Figure 5:
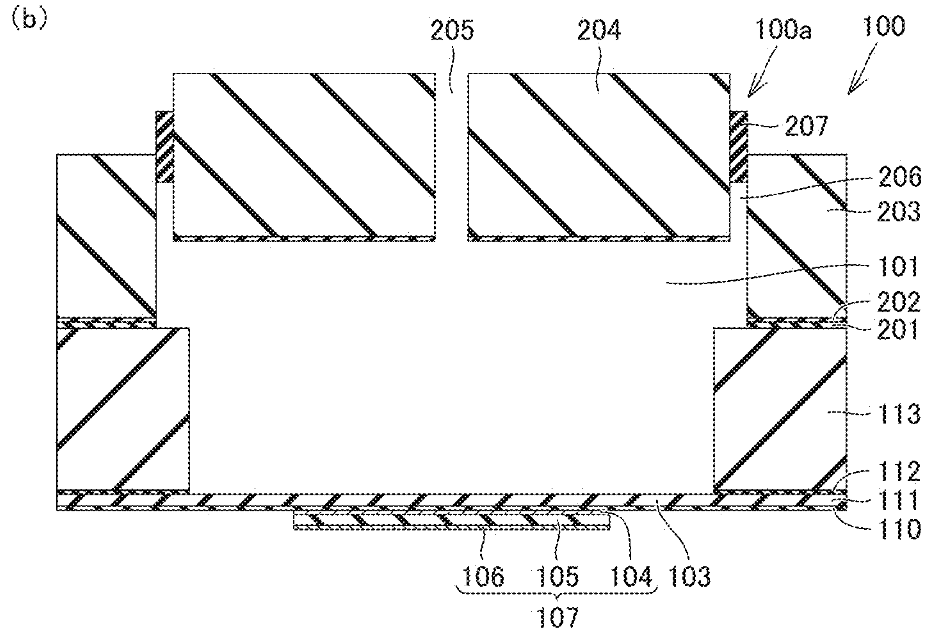

Reference will now be made to FIGS. 3 to 5 to describe a method for manufacturing ultrasonic transducer 10) according to the first embodiment. FIGS. 3 to 5 are cross sections, as taken along the line 11-11 indicated in FIG. 1, in steps of a process for manufacturing ultrasonic transducer 100 according to the first embodiment.

Ultrasonic transducer 100 is manufactured integrally by MEMS manufacturing technology.

FIGS. 3(*a*) to 3(*c*) are schematic cross sections showing a first step of the method for manufacturing ultrasonic transducer 100 according to the first embodiment. FIGS. 4(*a*) to 4(*c*) are schematic cross sections showing a second step of the method for manufacturing ultrasonic transducer 100 according to the first embodiment. FIGS. 5(*a*) to 5(*c*) are schematic cross sections showing a third step of the method for manufacturing ultrasonic transducer 100 according to the first embodiment.

Referring to FIG. 3(*a*), a first SOT (Silicon on Insulator) substrate 200 is prepared. FIG. 3(*a*) shows an initial state of first SOI substrate 200 before the structure is processed. Ultrasonic transducer 100 is manufactured by processing first SOI substrate 200. First SOI substrate 200 includes a surface silicon oxide film 110, a first silicon film 111, an intermediate silicon oxide film 112, and a second silicon film 113. First silicon film 11 is disposed on surface silicon oxide film 110. Intermediate silicon oxide film 112 is disposed on first silicon film 111. Second silicon film 113 is disposed on intermediate silicon oxide film 112. Intermediate silicon oxide film 112 is sandwiched between first silicon film 111 and second silicon film 113. First silicon film 111 has a thickness for example of 1 μm or more and 100 μm or less. Second silicon film 113 has a thickness for example of 100 μm or more and 600 μm or less. Although there are a variety of methods for forming surface silicon oxide film 110, a thermal oxidation method capable of extremely reducing surface roughness is suitable.

Referring to FIG. 3(*b*), piezoelectric element 107 is formed on first silicon film 111 of first SOI substrate 200. In the present embodiment, bottom electrode 104, piezoelectric thin film 105 and top electrode 106 are deposited in this order in layers on first silicon film 111, with surface silicon oxide film 110 interposed, to form piezoelectric element 107. Bottom electrode 104, piezoelectric thin film 105, and top electrode 106 are each a film stacked one on another. These stacked films are deposited by sputtering or the like. Bottom electrode 104 and top electrode 106 are for example 0.1 μm in thickness and piezoelectric thin film 105 are for example several micrometers in thickness.

Referring to FIG. 3(*c*), second silicon film 113 and intermediate silicon oxide film 112 of first SOI substrate 200 are etched. Desirably, the etching is deep reactive ion etching (DRIE). The etching is performed until at least intermediate silicon oxide film 112 is exposed. Intermediate silicon oxide film 112 will serve as an etching stopper layer. Intermediate silicon oxide film 112 is etched away by dry etching or the like. Thus, diaphragm 103 of first silicon film 111 is formed. A diaphragm of first silicon film 111 constitutes diaphragm 103. The step of forming diaphragm 103 includes the step of forming first support 102 of second silicon film 113.

Referring to FIG. 4(*a*), silicon substrate 210 has a surface with a silicon oxide film 202 thereon. An adhesive layer 201 is formed at a portion of silicon oxide film 202 bonded to second silicon film 113. Adhesive layer 201 is an organic adhesive such as polyimide, a metal such as aluminum or gold forming a eutectic layer with silicon, or the like. Adhesive layer 201 is unnecessary when direct bonding between substrates, such as surface activated bonding, is used for substrate-bonding.

Referring to FIG. 4(*b*), silicon substrate 210 is connected to second silicon film 113. In this embodiment, silicon oxide film 202 of silicon substrate 210 is bonded to second silicon film 113 via adhesive layer 201.

Referring to FIGS. 4(*c*) to 5(*b*), an opening 205 and a gap 101 are formed in acoustically resonant structure 100*a* including first SOI substrate 200 and silicon substrate 210 and diaphragm 103 and acoustically resonant structure 100*a* are also matched in resonant frequency so as to amplify a sonic wave of vibration of diaphragm 103. The step of causing the diaphragm and the acoustically resonant structure to match in resonant frequency includes the step of forming a trench 206 in silicon substrate 210 to form movable plate 204 and second support 203 connected to first support 102, and causing movable plate 204 to be movable relative to second support 203 to change gap 101 in volume to cause diaphragm 103 and acoustically resonant structure 100*a* to match in resonant frequency. The step of causing the diaphragm and the acoustically resonant structure to match in resonant frequency includes the step of fixing movable plate 204 to second support 203 while diaphragm 103 and acoustically resonant structure 100*a* are matched in resonant frequency.

Referring to FIG. 4(*c*), silicon substrate 210 is etched through by deep reactive ion etching (DRIE). Thus, movable plate 204, opening 205, and trench 206 are formed Silicon oxide film 202 will serve as an etching stopper layer. After deep reactive ion etching (DRIE), silicon oxide film 202 of the portion etched through is removed by dry etching or the like.

Referring to FIG. 5(*a*), adhesive 207 is introduced into trench 206. Adhesive 207 is thermosetting resin, UV (ultraviolet) curable resin, or a similar adhesive settable after positional adjustment. Adhesive 207 is applied in trench 206 by screen printing or dispenser drawing or a method capable of forming a pattern on a trench of a high aspect.

Referring to FIG. 5(*b*), movable plate 204 is positionally adjusted while a voltage is applied to piezoelectric element 107 to observe a sound pressure output from opening 205 or while a sonic wave is externally input to opening 205 to observe vibration of piezoelectric element 107. Thus, an optimal volume for gap 101 is determined. Adhesive 207 is set by heating, UV irradiation, or the like. While this adjustment may be done to a wafer, it may be done after adhesive 207 is introduced into trench 206 as shown in FIG. 5(*a*) and then a chip is cut off and assembled into a package.

A function and effect of the first embodiment will now be described. In the method for manufacturing ultrasonic transducer 100 according to the first embodiment, opening 205 and gap 101 are formed in acoustically resonant structure 100*a* including first SOT substrate 200 and silicon substrate 210 and diaphragm 103 and acoustically resonant structure 100*a* are also matched in resonant frequency so as to amplify a sonic wave of vibration of diaphragm 103. Therefore, diaphragm 103 and acoustically resonant structure 100*a* can be manufactured using semiconductor technology with high dimensional accuracy. Thereby, diaphragm 103 and acoustically resonant structure 100*a* can be manufactured with high dimensional accuracy. Further, causing diaphragm 103 and acoustically resonant structure 100*a* to match in resonant frequency can provide significantly effective amplification.

Ultrasonic transducer 100 is a MEMS ultrasonic transducer. Therefore, diaphragm 103 and acoustically resonant structure 100*a* can be manufactured with high dimensional accuracy by MEMS. For example, diaphragm 103 and acoustically resonant structure 100*a* can be manufactured with dimensional accuracy within an error range of 1 μm or more and 10 μm or less.

Further, ultrasonic transducer 100 that is a MEMS ultrasonic transducer can be manufactured inexpensively by collective mass production by a wafer process.

In the method for manufacturing ultrasonic transducer 100 according to the first embodiment, the step of causing the diaphragm and the acoustically resonant structure to match in resonant frequency includes the step of forming trench 206 in silicon substrate 210 to form movable plate 204 and second support 203 connected to first support 102, and causing movable plate 204 to be movable relative to second support 203 to change gap 101 in volume to cause diaphragm 103 and acoustically resonant structure 100*a* to match in resonant frequency. Thus, movable plate 204 can be caused to be movable relative to second support 203 to change gap 101 in volume to cause diaphragm 103 and acoustically resonant structure 100*a* to match in resonant frequency. Acoustically resonant structure 100*a* can thus be adjusted in resonant frequency.

In the method for manufacturing ultrasonic transducer 100 according to the first embodiment, the step of causing the diaphragm and the acoustically resonant structure to match in resonant frequency includes the step of fixing movable plate 204 to second support 203 while diaphragm 103 and acoustically resonant structure 100*a* are matched in resonant frequency. This allows movable plate 204 to be fixed to second support 203 while diaphragm 103 and acoustically resonant structure 100*a* are matched in resonant frequency. This allows the adjusted resonant frequency of acoustically resonant structure 100*a* to be fixed.

According to ultrasonic transducer 100 of the first embodiment, acoustically resonant structure 100*a* includes first support 102 and diaphragm 103 composed of an SOI substrate, and second support 203 and movable plate 204 composed of a silicon substrate. Therefore, diaphragm 103 and acoustically resonant structure 100*a* can be manufactured using semiconductor technology with high dimensional accuracy. Thereby, diaphragm 103 and acoustically resonant structure 100*a* can be manufactured with high dimensional accuracy. Further, opening 205 and gap 101 are formed to cause diaphragm 103 and acoustically resonant structure 100*a* to match in resonant frequency. Causing diaphragm 103 and acoustically resonant structure 100*a* to match in resonant frequency can provide significantly effective amplification.

Second Embodiment

A second embodiment provides the same structure, manufacturing method, and function and effect as the first embodiment unless otherwise specified.

A structure of and a method for manufacturing ultrasonic transducer 100 according to the second embodiment will now be described with reference to FIG. 6.

Figure 6:
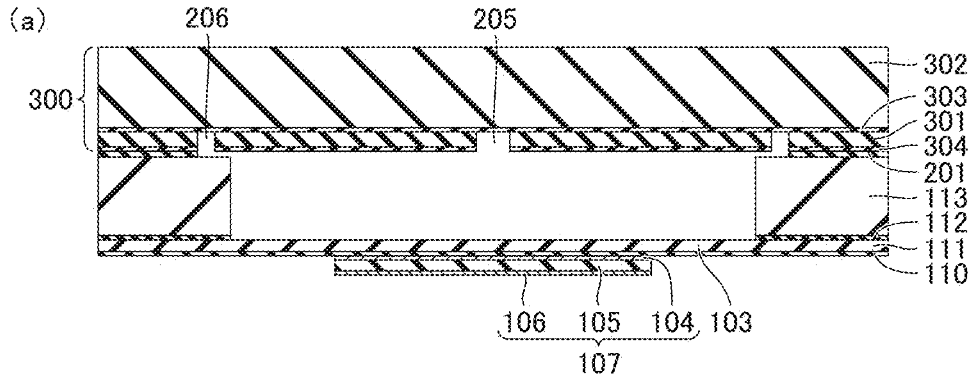
FIG. 6 is a schematic cross section for illustrating a method for manufacturing an ultrasonic transducer according to a second embodiment.
Figure 6:
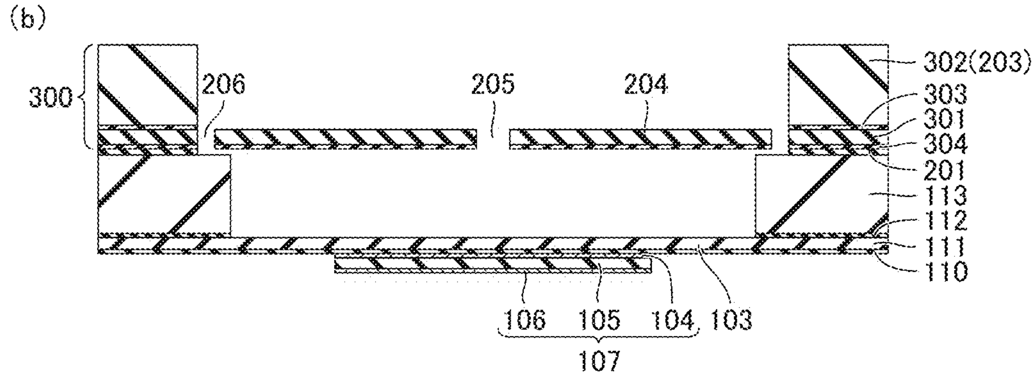
Figure 6:
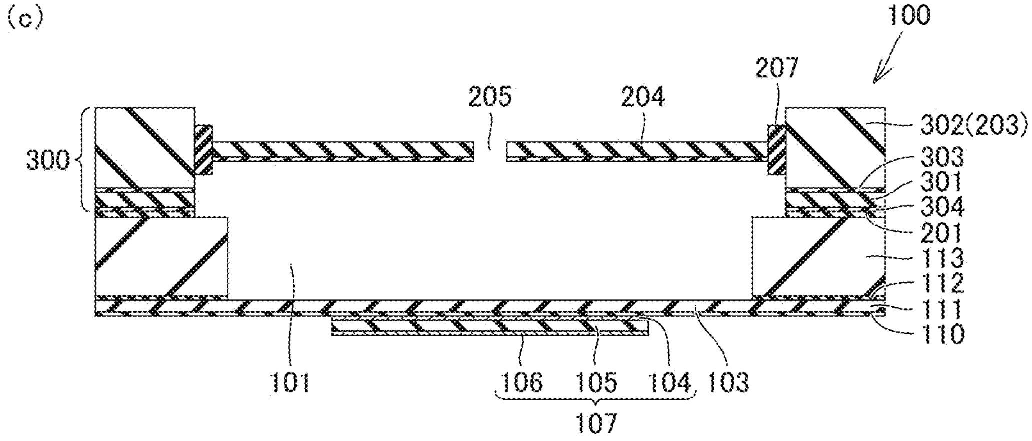

FIGS. 6(*a*) to 6(*c*) are schematic cross sections for illustrating the method for manufacturing ultrasonic transducer 100 according to the second embodiment. FIG. 6(*c*) is a schematic cross section showing the structure of ultrasonic transducer 100 according to the second embodiment.

Referring to FIG. 6(*a*), in the second embodiment, a second SOI substrate 300 is used instead of silicon substrate 210 in the first embodiment (see FIG. 4(*a*)). That is, silicon substrate 210 of the first embodiment (see FIG. 4(*a*) is second SOI substrate 300. Second SOI substrate 300 is stuck to second silicon film 113 using an adhesive layer 201. Second SOI substrate 300 includes an SOI active layer 301, an SOI support layer 302, an SOI intermediate silicon oxide film 303, and an SOI surface oxide film 304. SOI intermediate silicon oxide film 303 is sandwiched between SOI active layer 301 and SOI support layer 302. SOI active layer 301 is disposed on SOI surface oxide film 304.

For causing the diaphragm and the acoustically resonant structure to match in resonant frequency, SOI active layer 301, SOI support layer 302, and SOI intermediate silicon oxide film 303 are etched to form movable plate 204 of SOI active layer 301.

In active layer 301 of second SOI substrate 300, opening 205 and trench 206 are processed by deep reactive ion etching (DRIE) before second SOT substrate 300 is stuck to second silicon film 113. SOI intermediate silicon oxide film 303 will serve as an etching stopper layer.

Referring to FIG. 6(*b*), SOI support layer 302 is etched by deep reactive ion etching (DRIE). SOI intermediate silicon oxide film 303 will serve as an etching stopper layer. After deep reactive ion etching (DRIE), SOI intermediate silicon oxide film 303 is removed by dry etching or the like. In this way, movable plate 204 is formed.

Referring to FIG. 6(*c*), adhesive 207 is introduced into trench 206 shown in FIG. 6(*b*). Movable plate 204 is positionally adjusted while a voltage is applied to piezoelectric element 107 to observe a sound pressure output from opening 205 or while a sonic wave is externally input to opening 205 to observe vibration of piezoelectric element 107. Thus, an optimal volume for gap 101 is determined. SOI support layer 302 constitutes second support 203.

A function and effect of the second embodiment will now be described. In the method for manufacturing ultrasonic transducer 100 according to the second embodiment, for causing the diaphragm and the acoustically resonant structure to match in resonant frequency, SOI active layer 301, SOI support layer 302, and SOI intermediate silicon oxide film 303 are etched to form movable plate 204 of SOI active layer 301. As movable plate 204 is formed of SOI active layer 301, movable plate 204 has a thickness determined by that of SOI active layer 301. This facilitates adjusting movable plate 204 in thickness. This is significantly effective when movable plate 204 is small in thickness, in particular.

Third Embodiment

A third embodiment provides the same structure, manufacturing method, and function and effect as the first or second embodiment unless otherwise specified.

Figure 7:
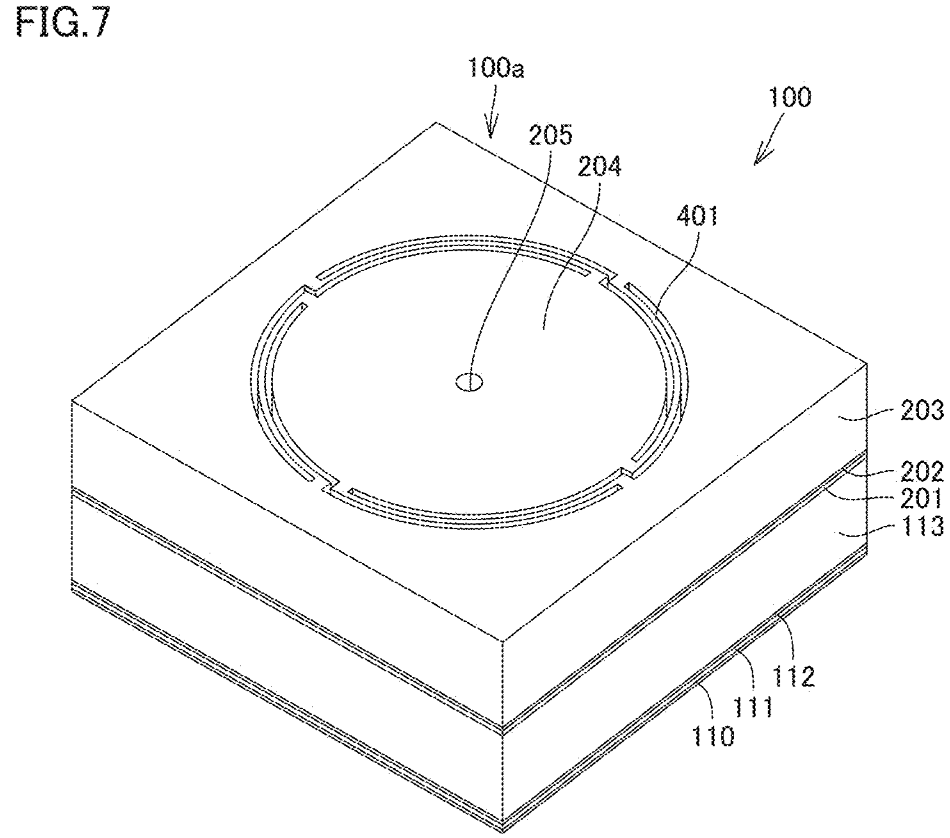
FIG. 7 is a perspective view schematically showing a configuration of an ultrasonic transducer according to a third embodiment.

A structure of and a method for manufacturing ultrasonic transducer 100 according to the third embodiment will now be described with reference to FIG. 7 FIG. 7 is a perspective view of ultrasonic transducer 100 according to the third embodiment.

The step of causing the diaphragm and the acoustically resonant structure to match in resonant frequency includes the step of forming a beam 401 in silicon substrate 210 interconnecting movable plate 204 and second support 203. Movable plate 204 having opening 205 and second support 203 are coupled by beam 401. Beam 401 has elasticity. Beam 401 is formed by deep reactive ion etching (DRIE) simultaneously when opening 205 and movable plate 204 are formed. That is, a slit is provided around beam 401.

In ultrasonic transducer 100 according to the third embodiment shown in FIG. 7, movable plate 204 shown in the first embodiment is supported by second support 203 by four beams 401.

Figure 8:
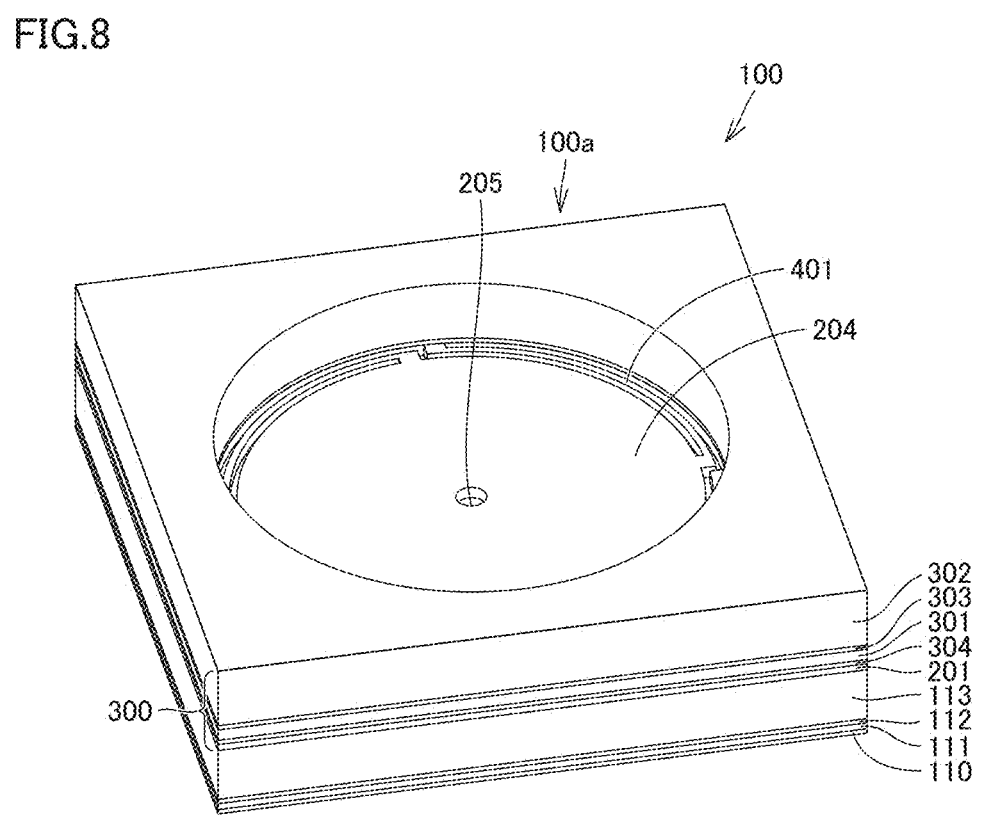

A structure of and a method for manufacturing an exemplary variation of ultrasonic transducer 100 according to the third embodiment will now be described with reference to FIG. 8. FIG. 8 is a perspective view of the exemplary variation of ultrasonic transducer 100 according to the third embodiment.

In the exemplary variation of ultrasonic transducer 100 according to the third embodiment shown in FIG. 8, movable plate 204 formed by SOI active layer 301 of SOI substrate 300 shown in the second embodiment is supported by SOI active layer 301 by a beam 401. Beam 401 is also formed of SOI active layer 301.

A function and effect of the third embodiment will now be described. In the method for manufacturing ultrasonic transducer 100 according to the third embodiment, the step of causing the diaphragm and the acoustically resonant structure to match in resonant frequency includes the step of forming beam 401 in silicon substrate 210 interconnecting movable plate 204 and second support 203. Movable plate 204 supported by beam 401 is not separated during manufacturing or while movable plate 204 is positionally adjusted, and manufacturing can be simplified.

Fourth Embodiment

A fourth embodiment provides the same structure, manufacturing method, and function and effect as the first or second embodiment unless otherwise specified.

Figure 9:
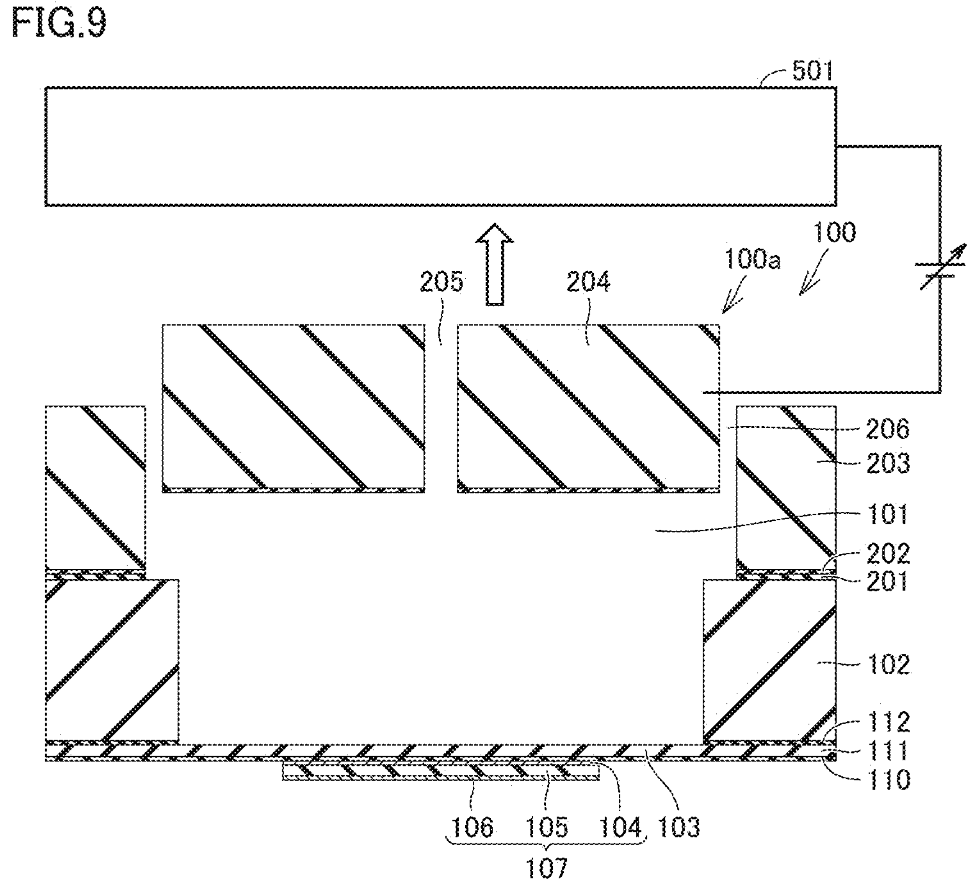
FIG. 9 is a schematic cross section for illustrating a method for adjusting an ultrasonic transducer according to a fourth embodiment.

A method for adjusting ultrasonic transducer 100 according to the fourth embodiment will now be described with reference to FIG. 9. FIG. 9 is a schematic cross section for illustrating a method for adjusting ultrasonic transducer 100 according to the fourth embodiment.

The step of causing the diaphragm and the acoustically resonant structure to match in resonant frequency includes the step of causing movable plate 204 to be movable relative to second support 203 by electrostatic attraction of a jig electrode 501. Jig electrode 501 is disposed over movable plate 204. Electrostatic attraction is applied between jig electrode 501 and movable plate 204, as indicated by a blank arrow in the figure. Thus, movable plate 204 is adjusted to an optimal position.

In the method for adjusting ultrasonic transducer 100 according to the fourth embodiment shown in FIG. 9, silicon substrate 210 indicated in the first embodiment is applied to movable plate 204.

Figure 10:
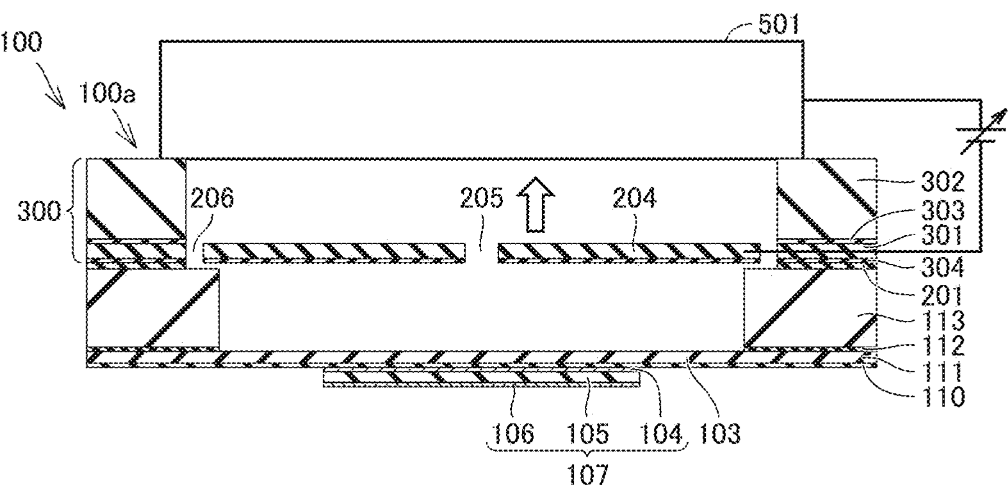
FIG. 10 is a schematic cross section for illustrating a method tor adjusting an exemplary variation of the ultrasonic transducer according to the fourth embodiment.

With reference to FIG. 10, a method for adjusting an exemplary variation of ultrasonic transducer 100 according to the fourth embodiment will be described. FIG. 10 is a schematic cross section for illustrating the method for adjusting the exemplary variation of ultrasonic transducer 100 according to the fourth embodiment.

In the method for adjusting the exemplary variation of ultrasonic transducer 100 according to the fourth embodiment shown in FIG. 10, second SOI substrate 300 indicated in the second embodiment is applied to movable plate 204. Jig electrode 501 is disposed on SOI support layer 302.

Hereinafter, a function and effect of the fourth embodiment will now be described. In the method for manufacturing ultrasonic transducer 100 according to the fourth embodiment, the step of causing the diaphragm and the acoustically resonant structure to match in resonant frequency includes the step of causing movable plate 204 to be movable relative to second support 203 by electrostatic attraction of jig electrode 501. Therefore, movable plate 204 can be positionally adjusted with high accuracy. Further, movable plate 204 can also be positionally adjusted in a simplified manner.

In the method for manufacturing ultrasonic transducer 100 according to the fourth embodiment, jig electrode 501 is disposed on SOI support layer 302. When the adjustment method according to the fourth embodiment is applied to movable plate 204 supported by beam 401 indicated in the third embodiment, movable plate 204 is positionally adjusted by a balance between the electrostatic attraction and resilient force of beam 401, and more accurate positional adjustment can be achieved.

Fifth Embodiment

A fifth embodiment has the same structure, manufacturing method, and function and effect as the first embodiment unless otherwise specified.

Figure 11:
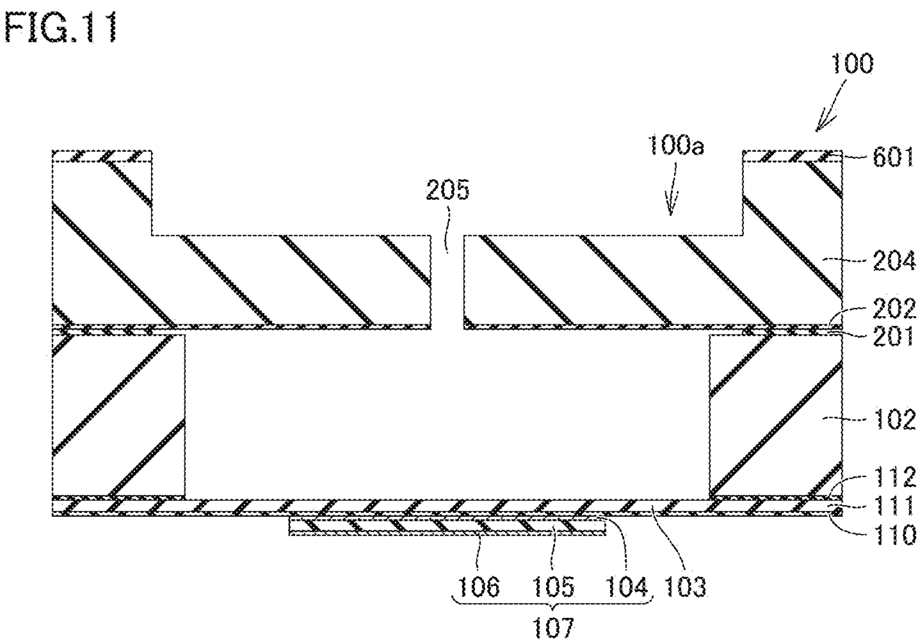
FIG. 11 is a schematic cross section for illustrating a method for adjusting an ultrasonic transducer according to a fifth embodiment.

A method for adjusting ultrasonic transducer 100 according to the fifth embodiment will now be described with reference to FIG. 11. FIG. 11 is a cross section for illustrating the method for adjusting ultrasonic transducer 100 according to the fifth embodiment.

In the method for adjusting a resonant frequency of acoustically resonant structure **100*a* of ultrasonic transducer 100 indicated in the first to fourth embodiments, movable plate 204 is positionally adjusted to adjust acoustically resonant structure 100*a*** in volume. The present embodiment employs an adjustment method different from those in the first to fourth embodiments.

In the method for adjusting ultrasonic transducer 100 according to the fifth embodiment shown in FIG. 11, opening 205 is adjusted in length to cause the diaphragm and the acoustically resonant structure to match in resonant frequency. The step of causing the diaphragm and the acoustically resonant structure to match in resonant frequency includes the step of changing opening 205 in length to cause diaphragm 103 and acoustically resonant structure **110*a* to match in resonant frequency. Opening 205 is adjusted in length by reducing movable plate 204 that is exposed from an etching mask 601** in thickness by dry etching or the like.

Figure 12:
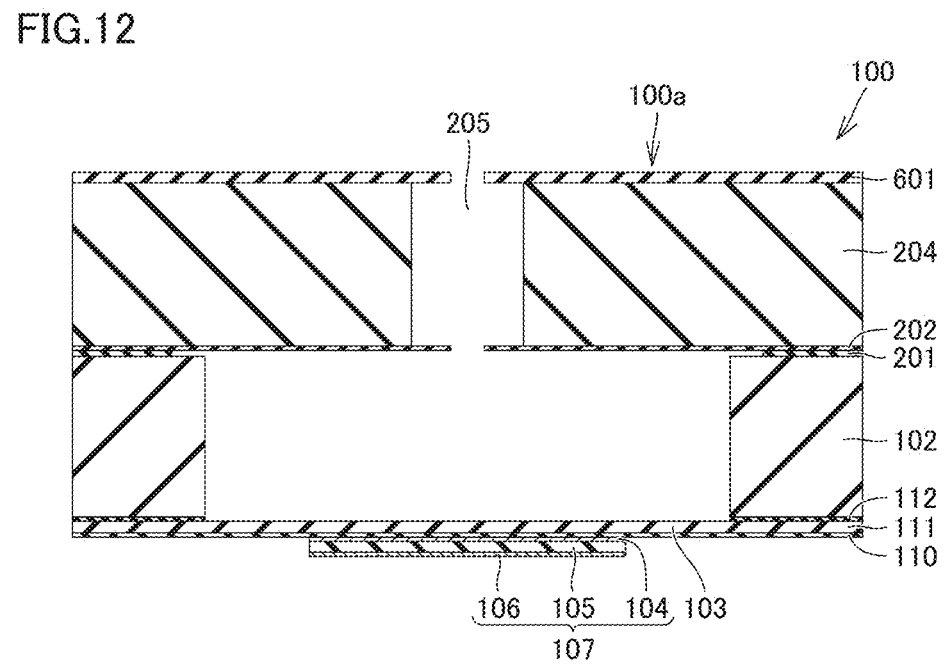

With reference to FIG. 12, a method for adjusting an exemplary variation of ultrasonic transducer 100 according to the fifth embodiment will now be described. FIG. 12 is a cross section for illustrating the method for adjusting the exemplary variation of ultrasonic transducer 1X) according to the fifth embodiment.

In the method for adjusting the exemplary variation of ultrasonic transducer 100 according to the fifth embodiment shown in FIG. 12, opening 205 is adjusted in area to cause the diaphragm and the acoustically resonant structure to match in resonant frequency. The step of causing the diaphragm and the acoustically resonant structure to match in resonant frequency includes the step changing opening 205 in area to cause diaphragm 103 and acoustically resonant structure 100*a* to match in resonant frequency. Opening 205 is adjusted in area by using a silicon isotropic etching technique using xenon difluoride ($XeF_2$) or the like with opening 205 covered with etching mask 601 to adjust opening 205 in diameter.

A function and effect of the fifth embodiment will now be described. In the method for manufacturing ultrasonic transducer 100 according to the fifth embodiment, the step of causing the diaphragm and the acoustically resonant structure to match in resonant frequency includes the step of changing opening 205 in length to cause diaphragm 103 and acoustically resonant structure 100*a* to match in resonant frequency. Thus, opening 205 can be changed in length to adjust acoustically resonant structure 100*a* in resonant frequency. Diaphragm 103 and acoustically resonant structure 100*a* can thus be matched in resonant frequency.

In the method for manufacturing ultrasonic transducer 100 according to the fifth embodiment, the step of causing the diaphragm and the acoustically resonant structure to match in resonant frequency includes the step of changing opening 205 in area to cause diaphragm 103 and acoustically resonant structure 100*a* to match in resonant frequency. Thus, opening 205 can be changed in area to adjust acoustically resonant structure 100*a* in resonant frequency. Diaphragm 103 and acoustically resonant structure 100*a* can thus be matched in resonant frequency.

In the method for manufacturing ultrasonic transducer 100 according to the fifth embodiment, the method for adjusting acoustically resonant structure 100*a* in resonant frequency has an advantageously wide adjustment range although the method requires an apparatus for processing such as dry etching and formation of thin film Combining the adjustment method according to the fifth embodiment with the positional adjustment of movable plate 204 indicated in the first to fourth embodiments allows resonant frequency adjustment in a wide range with high accuracy.

Sixth Embodiment

A configuration of distance measuring equipment 701 according to a sixth embodiment will now be described with reference to FIG. 13. Distance measuring equipment 701 according to the sixth embodiment includes ultrasonic transducer 100 according to any one of the first to fifth embodiments.

Distance measuring equipment 701 can measure a distance from distance measuring equipment 701 to an object 702 in a TOF (time of light) system.

Figure 13:
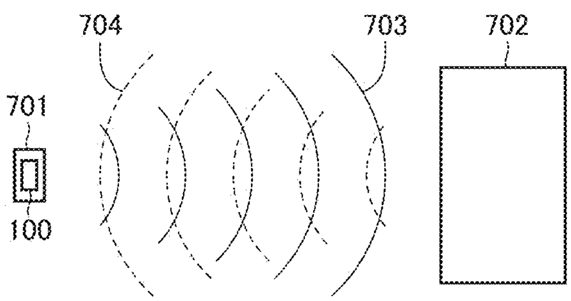
FIG. 13 schematically shows a configuration of distance measuring equipment according to a sixth embodiment.

FIG. 13 is a schematic diagram schematically showing how a distance to object 702 is measured in the TOF (time of light) system using distance measuring equipment 701. A transmitted wave 703 is indicated by a solid line. A wave 704 reflected by object 702 is indicated by a dashed line. Distance measuring equipment 701 includes a diaphragm, a piezoelectric element disposed on the diaphragm, and an acoustically resonant structure as a configuration. An electrical signal is input to the piezoelectric element, and the diaphragm vibrates at its resonant frequency to generate an ultrasonic wave of that frequency. The ultrasonic wave is amplified by the acoustically resonant structure and transmitted from distance measuring equipment 701 as transmitted wave 703. The ultrasonic wave is reflected by object 702 and reaches distance measuring equipment 701 as reflected wave 704. The ultrasonic wave having reached the distance measuring equipment is amplified by the acoustically resonant structure and resonates the diaphragm. The vibration of the diaphragm is received as an electrical signal by the piezoelectric element disposed on the diaphragm. A distance L from distance measuring equipment 701 to object 702 is calculated as $L=c\times t/2$, where t represents a period of time required from transmission of a sonic wave to reception of the sonic wave and c represents sonic velocity.

A function and effect of distance measuring equipment 701 according to the sixth embodiment will now be described. Applying ultrasonic transducer 100 described in any one of the first to fifth embodiments to distance measuring equipment 701 allows improved sound pressure to be generated and improved sensitivity to be achieved. This allows distance measuring equipment 701 to provide detection for large distance.

The above embodiments can be combined as appropriate. The presently disclosed embodiments are to be considered as illustrative in any respect and not restrictive. The scope of the present disclosure is defined by the terms of the claims, rather than the description above, and is intended to encompass any modifications within the meaning and scope equivalent to the terms of the claims.

REFERENCE SIGNS LIST ultrasonic transducer, 100*a* acoustically resonant structure, 101 gap, 102 first support. 103 diaphragm, 104 bottom electrode, 105 piezoelectric thin film, 106 top electrode. 107 piezoelectric element, 110 surface silicon oxide film, 111 first silicon film, 112 intermediate silicon oxide film, 113 second silicon film, 200 first SOI substrate, 201 adhesive layer, 202 silicon oxide film, 203 second support, 204 movable plate, 205 opening, 206 trench, 207 adhesive, 210 silicon substrate, 300 second SOI substrate, 301 active layer, 302 support layer, 303 SOI intermediate silicon oxide film, 304 surface oxide film, 401 beam, 501 jig electrode, 701 distance measuring equipment.

The invention claimed is:

1. A method for manufacturing an ultrasonic transducer, comprising:
- preparing a first SOI substrate including a first silicon film, a second silicon film, and an intermediate silicon oxide film sandwiched between the first silicon film and the second silicon film;
- forming a piezoelectric element on the first silicon film of the first SOI substrate;
- forming a diaphragm of the first silicon film by etching the second silicon film and the intermediate silicon oxide film of the first SOI substrate;
- connecting a silicon substrate to the second silicon film; and
- forming an opening and a gap in an acoustically resonant structure including the first SOI substrate and the silicon substrate, and also causing the diaphragm and the acoustically resonant structure to match in resonant frequency, so as to amplify a sonic wave of vibration of the diaphragm,
- wherein
- the step of forming a diaphragm includes forming a first support of the second silicon film, and
- the step of causing the diaphragm and the acoustically resonant structure to match in resonant frequency includes forming a trench in the silicon substrate to form a movable plate and a second support connected to the first support, and also causing the movable plate to be movable relative to the second support to change the gap in volume to cause the diaphragm and the acoustically resonant structure to match in resonant frequency.

2. The method for manufacturing an ultrasonic transducer according to claim 1, wherein the step of causing the diaphragm and the acoustically resonant structure to match in resonant frequency includes fixing the movable plate to the second support while the diaphragm and the acoustically resonant structure are matched in resonant frequency.

3. The method for manufacturing an ultrasonic transducer according to claim 1, wherein the silicon substrate is a second SOI substrate, the second SOI substrate includes an SOI active layer, an SOI support layer, and an SOI intermediate silicon oxide film sandwiched between the SOI active layer and the SOI support layer, and the step of causing the diaphragm and the acoustically resonant structure to match in resonant frequency includes etching the SOI active layer, the SOI support layer, and the SOI intermediate silicon oxide film to form the movable plate of the SOI active layer.

4. The method for manufacturing an ultrasonic transducer according to claim 1, wherein the step of causing the diaphragm and the acoustically resonant structure to match in resonant frequency includes forming a beam in the silicon substrate to interconnect the movable plate and the second support.

5. The method for manufacturing an ultrasonic transducer according to claim 1, wherein the step of causing the diaphragm and the acoustically resonant structure to match in resonant frequency includes causing the movable plate to be movable relative to the second support by electrostatic attraction of a jig electrode.

6. The method for manufacturing an ultrasonic transducer according to claim 5, wherein the silicon substrate is a second SOI substrate, the second SOI substrate includes an SOI support layer, and the jig electrode is disposed on the SOI support layer.

7. The method for manufacturing an ultrasonic transducer according to claim 1, wherein the step of causing the diaphragm and the acoustically resonant structure to match in resonant frequency includes changing the opening in length to cause the diaphragm and the acoustically resonant structure to match in resonant frequency.

8. The method for manufacturing an ultrasonic transducer according to claim 1, wherein the step of causing the diaphragm and the acoustically resonant structure to match in resonant frequency includes changing the opening in area to cause the diaphragm and the acoustically resonant structure to match in resonant frequency.

9. An ultrasonic transducer comprising:

an acoustically resonant structure including a first support and a diaphragm composed of an SOI substrate, and a second support and a movable plate composed of a silicon substrate; and a piezoelectric element attached to the acoustically resonant structure, the diaphragm composed of the SOI substrate being connected to the first support, the second support composed of the silicon substrate being connected to the first support on a side opposite to the diaphragm with respect to the first support, the movable plate composed of the silicon substrate being connected to the second support so as to face the diaphragm, the piezoelectric element being connected to the diaphragm of the acoustically resonant structure, the movable plate having an opening, the opening being in communication with a gap surrounded by the first support, the diaphragm, the second support, and the movable plate, the opening and the gap being formed to cause the diaphragm and the acoustically resonant structure to match in resonant frequency.

10. Distance measuring equipment comprising the ultrasonic transducer according to claim 9.

* * * * *